United States Patent
Doppelbauer et al.

(10) Patent No.: US 9,404,399 B2
(45) Date of Patent: Aug. 2, 2016

(54) EXHAUST VALVE ASSEMBLY FOR A TWO-STROKE ENGINE

(71) Applicant: BRP-POWERTRAIN GMBH & CO. KG, Gunskirchen (AT)

(72) Inventors: Markus Doppelbauer, Gunskirchen (AT); Christian Berger, Meggenhofen (AT); Gunther Zauner, St. Willibald (AT); Gottfried Kaiser, Gunskirchen (AT); Michael Seyrl, Wels (AT)

(73) Assignee: BRP-ROTAX GMBH & CO KG, Gunskirchen (AT)

( * ) Notice: Subject to any disclaimer, the term of this patent is extended or adjusted under 35 U.S.C. 154(b) by 58 days.

(21) Appl. No.: 14/340,216

(22) Filed: Jul. 24, 2014

(65) Prior Publication Data

US 2015/0034060 A1 Feb. 5, 2015

Related U.S. Application Data

(60) Provisional application No. 61/860,641, filed on Jul. 31, 2013.

(51) Int. Cl.
*F02D 13/02* (2006.01)
*F01L 1/38* (2006.01)
*F02B 25/20* (2006.01)
(Continued)

(52) U.S. Cl.
CPC ...... *F01L 1/38* (2013.01); *F01L 5/20* (2013.01); *F01L 13/0015* (2013.01); *F02B 25/20* (2013.01); *F02B 27/06* (2013.01);
(Continued)

(58) Field of Classification Search
CPC .... F02B 27/06; F02B 2075/025; F02B 25/20; F01L 5/20; F01L 1/38; F01L 13/0015; F02D 13/0284; Y02T 10/18; Y02T 10/146
USPC ........................................................ 123/65 PE
See application file for complete search history.

(56) References Cited

U.S. PATENT DOCUMENTS 5,220,890 A * 6/1993 Koriyama .................. 123/65 PE
5,752,476 A * 5/1998 Nakamura ................. 123/65 PE
(Continued)

FOREIGN PATENT DOCUMENTS

| EP | 1988270 A1 | 11/2008 |
| JP | 05086868 A | 4/1993 |
| JP | 07279675 A | 10/1995 |

OTHER PUBLICATIONS

Patent abstract of JP05086868, Published Apr. 6, 1993.
(Continued)

*Primary Examiner* — Marguerite McMahon
(74) *Attorney, Agent, or Firm* — BCF LLP (57) ABSTRACT

An exhaust valve assembly has a valve actuator, a first valve part (FVP) operatively connected to the actuator, a second valve part (SVP), and at least one auxiliary valve operatively connected to the second valve part. When the actuator is in a first position, the FVP is in a fourth position, the SVP is in a seventh position and the at least one auxiliary valve is in a ninth position. When the actuator is in a second position, the FVP is in a fifth position, the SVP is in the seventh position and the at least one auxiliary valve is in the ninth position. When the actuator is in a third position, the FVP is in a sixth position, the SVP is in an eighth position and the at least one auxiliary valve is in a tenth position. The second position is intermediate the first and third positions.

17 Claims, 12 Drawing Sheets

(51) Int. Cl.
  *F01L 13/00* (2006.01)
  *F02B 27/06* (2006.01)
  *F01L 5/20* (2006.01)
  *F02B 75/02* (2006.01)

(52) U.S. Cl.
  CPC ...... *F02D 13/0284* (2013.01); *F02B 2075/025* (2013.01); *Y02T 10/146* (2013.01); *Y02T 10/18* (2013.01)

(56) References Cited

U.S. PATENT DOCUMENTS

| | | | |
|---|---|---|---|
| 6,244,227 | B1 | 6/2001 | Matte |
| 6,273,036 | B1 | 8/2001 | Uchida et al. |
| 7,213,544 | B2 | 5/2007 | Zauner |
| 7,367,295 | B2 | 5/2008 | Zauner |
| 7,484,482 | B1 | 2/2009 | Mayringer |
| 7,762,220 | B2 | 7/2010 | Okanovic |
| 2002/0002958 | A1 | 1/2002 | Uchida et al. |
| 2005/0166872 | A1 | 8/2005 | Zauner |
| 2007/0186882 | A1 | 8/2007 | Zauner |
| 2008/0283029 | A1 | 11/2008 | Sekira |

OTHER PUBLICATIONS

Patent abstract of JP07279675, Published Oct. 27, 1995.
European Patent Office; Extended European Search Report of Application No. 14179194.7; Paulson, bo; mailed on May 29, 2015.

\* cited by examiner

EXHAUST VALVE ASSEMBLY FOR A TWO-STROKE ENGINE

CROSS-REFERENCE

The present application claims priority to U.S. Provisional Patent Application No. 61/860,641, filed Jul. 31, 2013, the entirety of which is incorporated herein by reference.

FIELD OF TECHNOLOGY

The present technology relates to an exhaust valve assembly suitable for use with an exhaust port of a two stroke internal combustion engine.

BACKGROUND

In order to ensure that two-stroke engines have a high power capacity at high speeds, a high volumetric efficiency is required and the charge losses must be minimized. This can be accomplished by an early and therefore higher opening of the exhaust passage into the cylinder. The adjustment of the exhaust port, to obtain maximum power capacity of the engine at high speeds involves, in the medium speed range, not only an appreciable decrease of the useful stroke, but also a large increase of the charge losses. As a result, the torque decreases and the specific fuel consumption increases greatly. A higher torque in conjunction with lower fuel consumption can be obtained, at lower engine speeds, only if the opening of the exhaust port happens later in the down stroke of the piston which means that the exhaust port must be at a lower position than it is at high engine speeds.

For this purpose it is known to provide a valve in the exhaust port which is movable between a full flow position and a flow restricting position. When in the flow restricting position, the end of the valve is substantially flush with the peripheral surface of the cylinder bore. In this flow restricting position, the exhaust port is effectively lowered in relation to the down stroke of the piston. The valve is adjustable to vary the relative height of the exhaust port as is required by the given operating conditions of the engine.

U.S. Pat. No. 7,484,482 B1, issued on Feb. 3, 2009 to Mayringer, entitled "Valve Assembly for a Two-Stroke Engine", discloses a valve assembly having a two-part valve provided, in part, in a main exhaust port and auxiliary valves provided, in part, in auxiliary exhaust ports. The valve assembly also has an actuator to which the valves are connected. The actuator is movable between a lowered position, an intermediate position and a raised position. The two-part valve has a first valve part connected to the actuator and movable with the actuator between the lowered position, the intermediate position, and the raised position. The auxiliary valves are connected to the first valve part and are movable with the first valve part and the actuator between the lowered position, the intermediate position, and the raised position. The two-part valve has a second valve part that is movable between a lowered position and a raised position. When the first valve part is in its lowered position or its intermediate position, the second valve part is in its lowered position. When the first valve part is in its raised position, the second valve part is in its raised position.

Although the valve assembly of Mayringer provides an intermediate valve position used at medium engine speeds which is an improvement over the prior two position valves, the auxiliary valves partially open the auxiliary exhaust ports when in this intermediate position. This is because the auxiliary valves are connected to and movable with the first valve part. Maintaining the auxiliary exhaust ports fully closed when the first valve part is in the intermediate position would further improve fuel consumption.

Therefore, there is a need for an exhaust valve assembly having auxiliary exhaust valves that close the auxiliary exhaust ports at medium engine speeds.

SUMMARY

It is an object of the present technology to ameliorate at least some of the inconveniences present in the prior art.

According to one aspect of the present technology, there is provided an exhaust valve assembly for a two-stroke internal combustion engine having a valve actuator movable between a first position, a second position and a third position, the second position being intermediate the first and third positions, a two-part valve having a first valve part and a second valve part, the first valve part being operatively connected to the valve actuator, and at least one auxiliary valve operatively connected to the second valve part. The first valve part is in a fourth position when the valve actuator is in the first position. The first valve part is in a fifth position when the valve actuator is in the second position. The first valve part is in a sixth position when the valve actuator is in the third position. The fifth position is intermediate the fourth position and the sixth position. The second valve part is in a seventh position when the valve actuator is in any one of the first and second position. The second valve part is in an eighth position when the valve actuator is in the third position. The at least one auxiliary valve is in a ninth position when the second valve part is in the seventh position. The at least one auxiliary valve is in a tenth position when the second valve part is in the eighth position.

In some implementations of the present technology, a distance traveled by the at least one auxiliary valve between the ninth and tenth positions is greater than a distance traveled by the first valve part between the fourth and sixth positions.

In some implementations of the present technology, the fourth, seventh and ninth positions are flow restricting positions of the first valve part, the second valve part and the at least one auxiliary valve respectively. The sixth, eighth and tenth positions are full flow positions of the first valve part, the second valve part and the at least one auxiliary valve respectively. The fifth position is an intermediate position of the first valve part.

In some implementations of the present technology, a lever pivotally connects the at least one auxiliary valve to the second valve part.

In some implementations of the present technology, the lever has at least one arm having a first end and a second end, at least one first shaft connected to the first end of the at least one arm, the at least one first shaft being pivotally connected to the at least one auxiliary valve, at least one second shaft connected between the first and second ends of the at least one arm, the at least one second shaft being pivotally connected to the second valve part, and at least one third shaft connected to the second end of the at least one arm, the at least one third shaft abutting a portion of the valve actuator.

In some implementations of the present technology, the at least one third shaft abuts at least one post extending from the valve actuator.

In some implementations of the present technology, the at least one arm is V-shaped. The at least one second shaft is connected at the corner of the V-shaped arm.

In some implementations of the present technology, the second valve part has at least one pair of fingers. The at least one second shaft is received between the at least one pair of fingers.

In some implementations of the present technology, when the first valve part moves from the fifth position to the sixth position, the first valve part abuts at least one of the fingers to move the second valve part from the seventh position to the eight position and the at least one auxiliary valve from the ninth position to the tenth position.

In some implementations of the present technology, when the first valve part moves from the fifth position to the sixth position, the first valve part abuts a portion of the second valve part to move the second valve part from the seventh position to the eight position and the at least one auxiliary valve from the ninth position to the tenth position.

In some implementations of the present technology, at least one spring is provided for biasing the second valve part toward the seventh position.

In some implementations of the present technology, the at least one auxiliary valve is two auxiliary valves. The first valve part and the second valve part are disposed between the two auxiliary valves.

In some implementations of the present technology, the valve actuator is biased toward the second position.

In some implementations of the present technology, the valve actuator is a pneumatic actuator.

According to another aspect of the present technology, there is provided an internal combustion engine having a crankcase, a crankshaft disposed in the crankcase, a cylinder block connected to the crankcase, the cylinder block having a main exhaust passage and at least one auxiliary exhaust passage, a cylinder defined in the cylinder block, a piston movably disposed within the cylinder and being operatively connected to the crankshaft, and a valve assembly according to one or more of the above aspect and implementations connected to the cylinder block. When the first valve part is in the fourth position, the first valve part extends a first distance in the main exhaust passage. When the first valve part is in the fifth position, the first valve part extends a second distance in the main exhaust passage, the second distance being less than the first distance. When the first valve part is in the sixth position, the first valve part is withdrawn from the main exhaust passage. When the second valve part is in the seventh position, the second valve part extends a third distance in the main exhaust passage. When the second valve part is in the eighth position, the second valve part is withdrawn from the main exhaust passage. When the at least one auxiliary valve is in the ninth position, the at least one auxiliary valve extends a fourth distance in the at least one auxiliary exhaust passage. When the at least one auxiliary valve is in the tenth position, the at least one auxiliary valve is withdrawn from the at least one auxiliary exhaust passage.

In some implementations of the present technology, the fourth distance is greater than the second and third distances.

According to another aspect of the present technology, there is provided a method of operating an exhaust valve assembly of a two-stroke internal combustion engine. The valve assembly includes a valve actuator, a two-part valve having a first valve part operatively connected to the valve actuator and a second valve part, and at least one auxiliary valve operatively connected to the two-part valve. The method comprises: moving the valve actuator between a first position, a second position and a third position, the second position being intermediate the first and third positions; moving the first valve part to a fourth position when the valve actuator is moved to the first position; moving the first valve part to a fifth position when the valve actuator is moved to the second position; moving the first valve part to a sixth position when the valve actuator is moved to the third position, the fifth position being intermediate the fourth position and the sixth position; moving the second valve part to a seventh position when the valve actuator is moved to any one of the first and second position; moving the second valve part to an eighth position when the valve actuator is moved to the third position; moving the at least one auxiliary valve to a ninth position when the second valve part is moved to the seventh position; and moving the at least one auxiliary valve to a tenth position when the second valve part is moved to the eighth position.

For purposes of the present application, the term "ambient pressure" means a pressure of the surrounding fluid, the term "positive pressure" means a pressure which is greater than the ambient pressure, and the term "negative pressure" means a pressure which is less than the ambient pressure.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
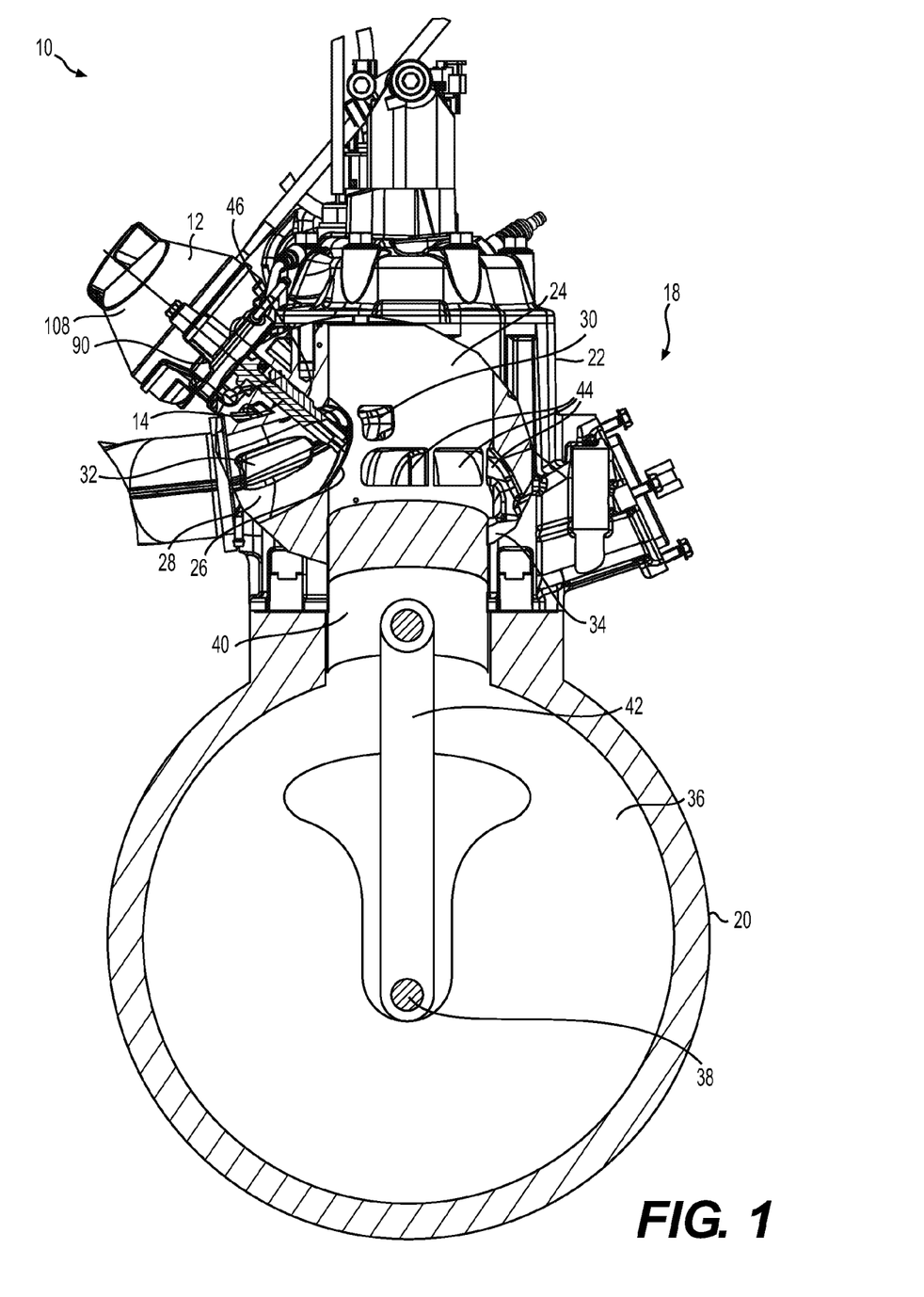
FIG. 1 is a partial cross-sectional view of a two-stroke engine having an exhaust valve assembly.
Figure 2:
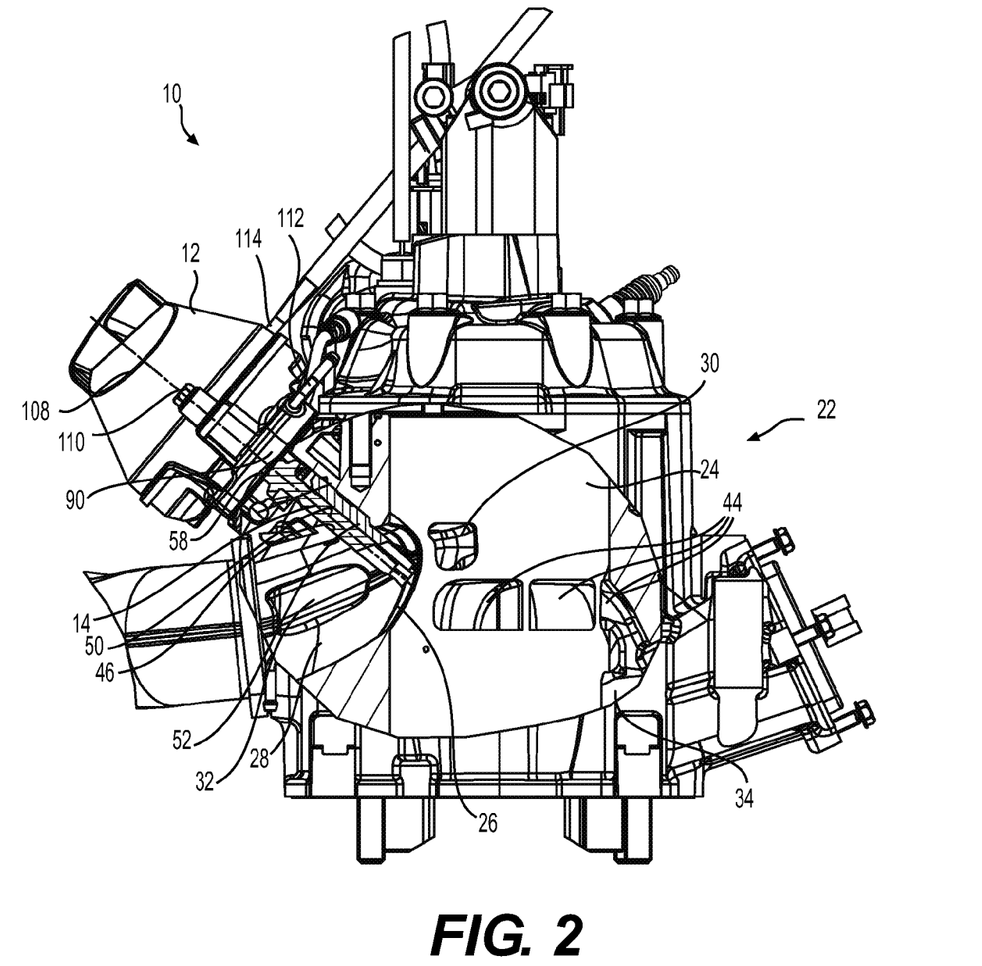
FIG. 2 is a partial cross-sectional view of a cylinder block, a cylinder head and the exhaust valve assembly of the engine of FIG. 1.

An exhaust valve assembly 10 has a valve actuator 12, a two-part valve 14 connected to the actuator 12 and auxiliary valves 16 (FIG. 4A) connected to the valve 14. As shown in FIG. 1, the exhaust valve assembly 10 forms part of a two-stroke engine 18. It should be understood that the term "two-stroke engine" includes an engine having at least one cylinder. The engine 18 comprises a crankcase 20 and a cylinder block 22 connected to the crankcase 20. A cylinder 24, defined in the cylinder block 22, has a main exhaust port 26. An exhaust passage 28 communicates with the main exhaust port 26. Auxiliary exhaust ports 30 are disposed on each side of the main exhaust port 26 so as to be symmetrical to the main exhaust port 26. The auxiliary exhaust ports 30 are connected to the exhaust passage 28 by way of auxiliary passages 32. An admission port 34 is defined in the cylinder block 22. The crankcase 20 has an internal chamber 36 communicating with the admission port 34. A crankshaft 38 is disposed in the internal chamber 36 of the crankcase 20. A piston 40 is connected to the crankshaft 38 via a connecting rod 42 and reciprocates in the cylinder 24 during operation of the engine 18. The piston 40 is adapted to open or close the main exhaust port 26, the auxiliary exhaust ports 30 and transfer ports 44.

When the engine 18 is operating at low or medium speeds, the main exhaust port 26 and the auxiliary exhaust ports 30 should not be exposed prematurely by the piston 40, as the latter moves downwardly. Such a premature exposure of the main exhaust port 26 and the auxiliary exhaust ports 30 is prevented by the valve 14. The valve 14 is slidably mounted in a guide channel 46 having a longitudinal direction that is approximately radial with respect to the cylinder 24 and extends at an acute angle to the axis of the main exhaust passage 26. Auxiliary guide channels (not shown) are provided parallel to the guide channel 46 in the area of the auxiliary passages 32 to receive the auxiliary valves 16.

Figure 4A:
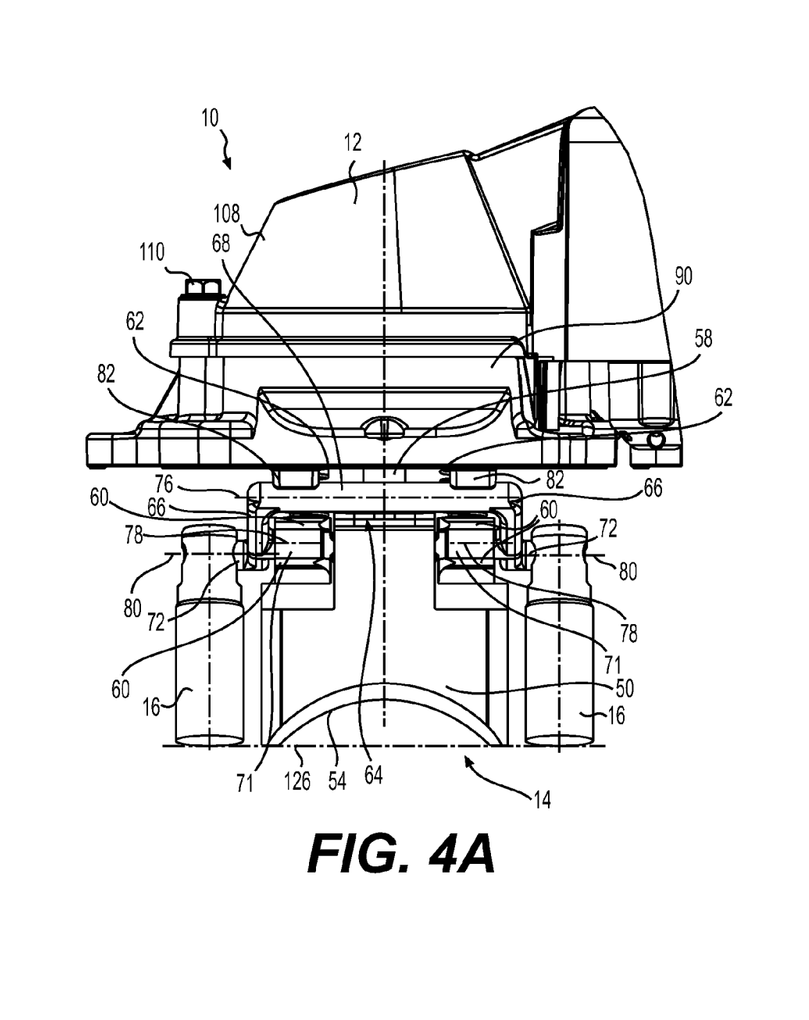
FIG. 4A is a front elevation view of the exhaust valve assembly of the engine of FIG. 1 with a first valve part, a second valve part and auxiliary valves in flow restricting positions.
Figure 4B:
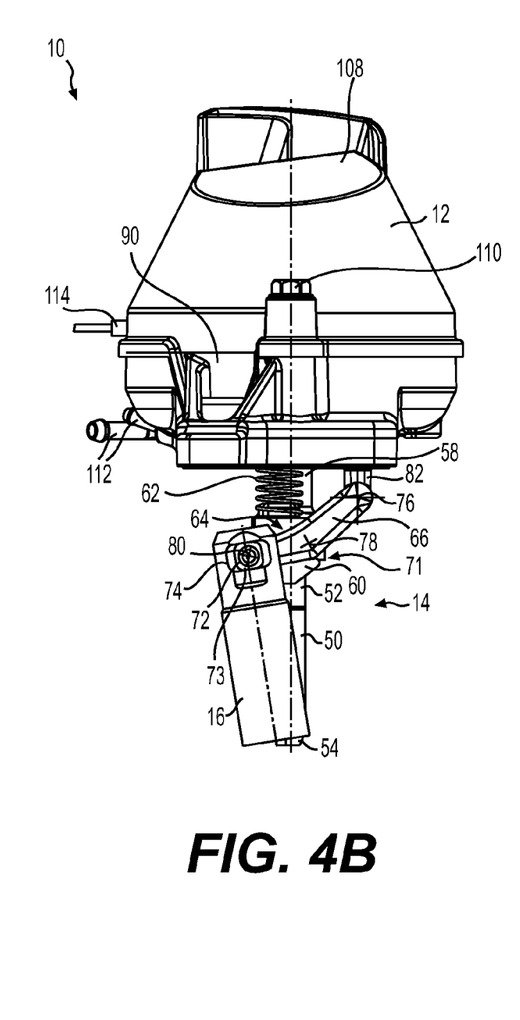
FIG. 4B is a right side elevation view of the exhaust valve assembly in the position shown in FIG. 4A.
Figure 4C:
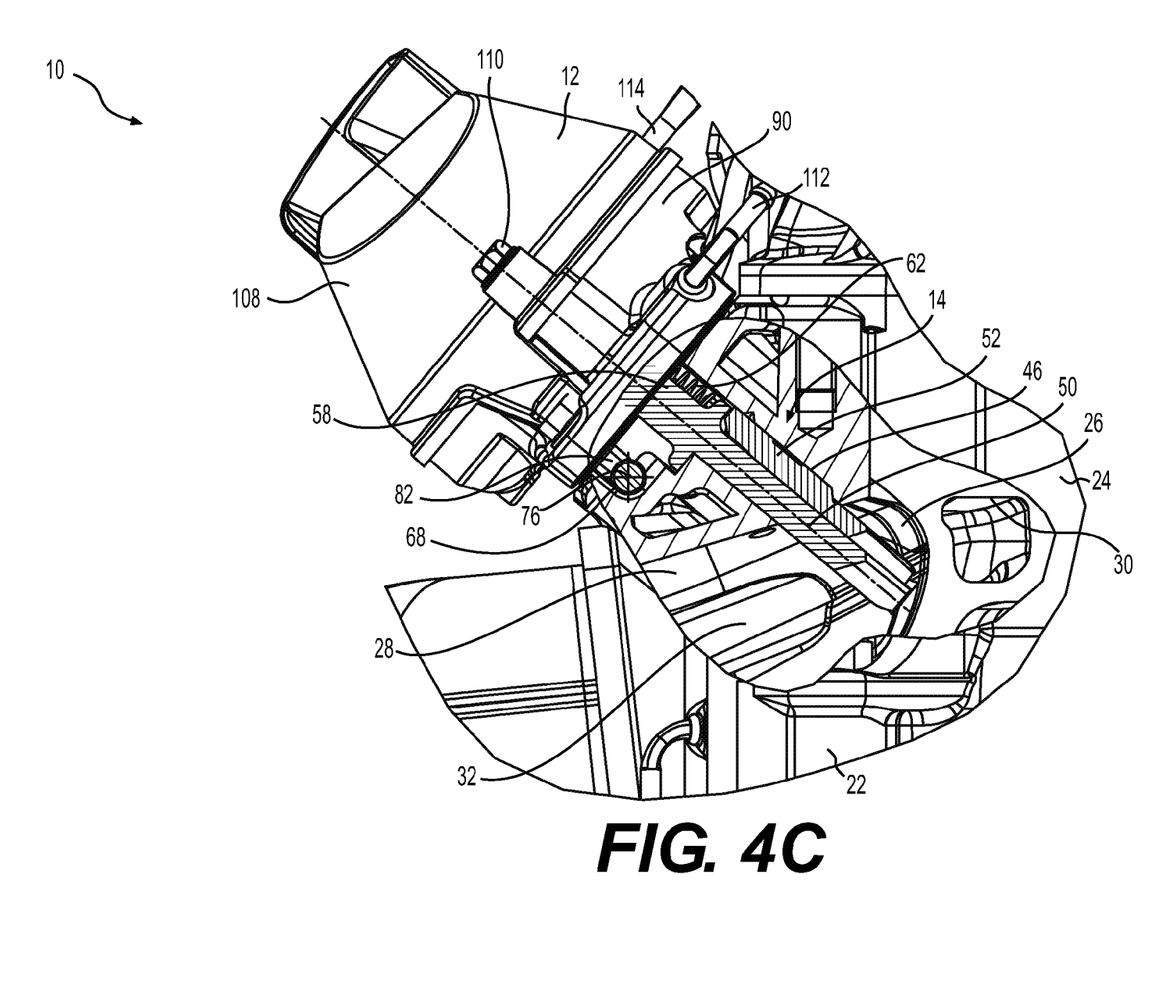
FIG. 4C is a partial cross-sectional view of the exhaust valve assembly in the position shown in FIG. 4A shown on the engine of FIG. 1.

Turning to FIGS. 4A to 4C, the two-part valve 14 will now be described. The two-part valve 14 includes a first valve part 50 and a second valve part 52. The first valve part 50 and the second valve part 52 each have an edge 54, 56 (FIG. 5A) respectively, shaped so as to match the shape of the cylinder 12. In operation, as in FIG. 4C, the second valve part 52 is supported and is disposed above the first valve part 50. The first valve part 50 has an integrally formed connector 58 which connects the first valve part 50 to the actuator 12. The second valve part 52 has two pairs of fingers 60, the lower ones of which are engaged by the first valve part 50 as the first valve part 50 is moved to a full flow position, as described in greater detail below. A pair of springs 62 is provided between the second valve part 52 and a bottom of the valve actuator 12.

As mentioned above, the exhaust valve assembly 10 also has auxiliary valves 16 for restricting the flow of exhaust gases in the auxiliary exhaust passages 32. The auxiliary valves 16 are separate from and movably connected to the two-part valve 14 via a lever 64. The lever 64 has two arms 66 that are connected to each other at one end by a shaft 68. The arms 66 have a generally obtuse V-shape. Shafts 70 extend inwardly from the corners of the V-shaped arms 66. Each shaft 70 has a bushing 71 disposed around it. The bushing 71 has a generally rectangular outer perimeter. Each bushing 71 is received between a corresponding pair of fingers 60 such that the shafts 70 can pivot inside their respective bushings 71 in the space between the two fingers 60 of their corresponding pairs of fingers 60. Shafts 72 extend outwardly from the ends of the arms 66 opposite the ends of the arms 66 where the shaft 68 is provided. Each shaft 72 has a bushing 73 disposed around it. The bushing 73 has a generally rectangular outer perimeter. The bushings 73 are received in oblong apertures 74 defined in the upper ends of the auxiliary valves 16. In the present implementation, a distance from the central axis 76 of the shaft 68 to the central axes 78 of the shafts 70 is greater than a distance from the central axes 78 of the shafts 70 to the central axes 80 of the shafts 72. Also, in the present implementation the angle between a line passing through the central axis 76 of the shaft 68 and the central axes 78 of the shafts 70 and a line passing through the central axes 78 of the shafts 70 and the central axes 80 of the shafts 72 is between 140 degrees and 150 degrees, but other angles are contemplated.

Posts 82 extend from a bottom of the actuator 12. The posts 82 each have an arcuate lower surface against which the shaft 68 abuts. As a result, when the second valve part 52 moves from its flow restricting position to its full flow position, the shafts 70 move with the second valve part 52. This movement of the shafts 70 causes the lever 64 to pivot about the central axis 76 of the shaft 68, thereby moving the auxiliary valves 16 from their flow restricting positions to their full flow positions as will be described in greater detail below.

Figure 4D:
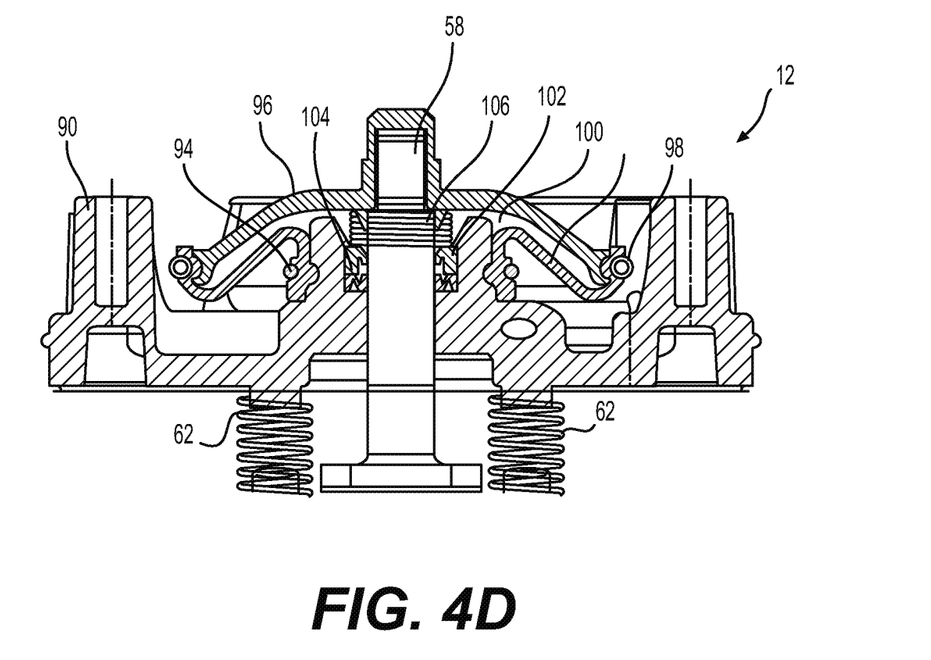
FIG. 4D is a cross-sectional view of an actuator of the exhaust valve assembly of FIG. 4A shown in a position corresponding to the position of the exhaust valve assembly shown in FIG. 4A.

The valve actuator 12 will now be described with respect to FIG. 4D. The valve actuator 12 has a valve housing 90. A first end portion of a diaphragm 92 is connected via a first annular spring 94 onto the valve housing 90. A pressure chamber wall 96 is connected to a second end portion of the diaphragm 92 via a second annular spring 98. The diaphragm 92 and the pressure chamber wall 96 define therebetween a pressure chamber 100 which has a variable volume. The connector 58 of the first valve part 50 passes through the valve housing 90 and is connected to the pressure chamber wall 96 so as to move therewith. A ring 102 and a sealing ring 104 are disposed between the valve housing 90 and the connector 58 to guide the connector 58 as it moves with the pressure chamber wall 96 and to prevent exhaust gases from entering the pressure chamber 100 from the guide channel 46. A spring 106 is disposed inside the pressure chamber 100 around the connector 58 between the pressure chamber wall 96 and the ring 102. The spring 106 biases the first valve part 50 toward an intermediate position, shown in FIGS. 5A to 5C, described in greater detail below. It is contemplated that the spring 106 could be located elsewhere and still bias the first valve part 50 toward the intermediate position, such as between the first valve part 50 and a bottom of the valve housing 90. It is also contemplated that the spring 106 could be omitted completely and that the diaphragm 92 could be self-biasing so as to bias the first valve part 50 toward the intermediate position, by properly shaping the diaphragm 92 and by making it out of an appropriate material. A cover 108 (FIG. 4A) is connected to the valve housing 90 by bolts 110 to enclose the pressure chamber wall 96 and diaphragm 92 assembly therebetween.

The valve housing 90 is connected to the cylinder block 22 via bolts (not shown). A seal (not shown) is disposed between the valve housing 90 and the cylinder block 22 to prevent exhaust gases from leaving the exhaust passage 28 via the guide channel 46. A port 112 (FIG. 4C) of the pressure chamber 100 disposed on the valve housing 90 fluidly communicates the pressure chamber 100 with at least one pressure source, via a pressure control device, as described below. Another port 114 (FIG. 4C) is used to ventilate the room surrounding the pressure chamber 100.

Figure 3:
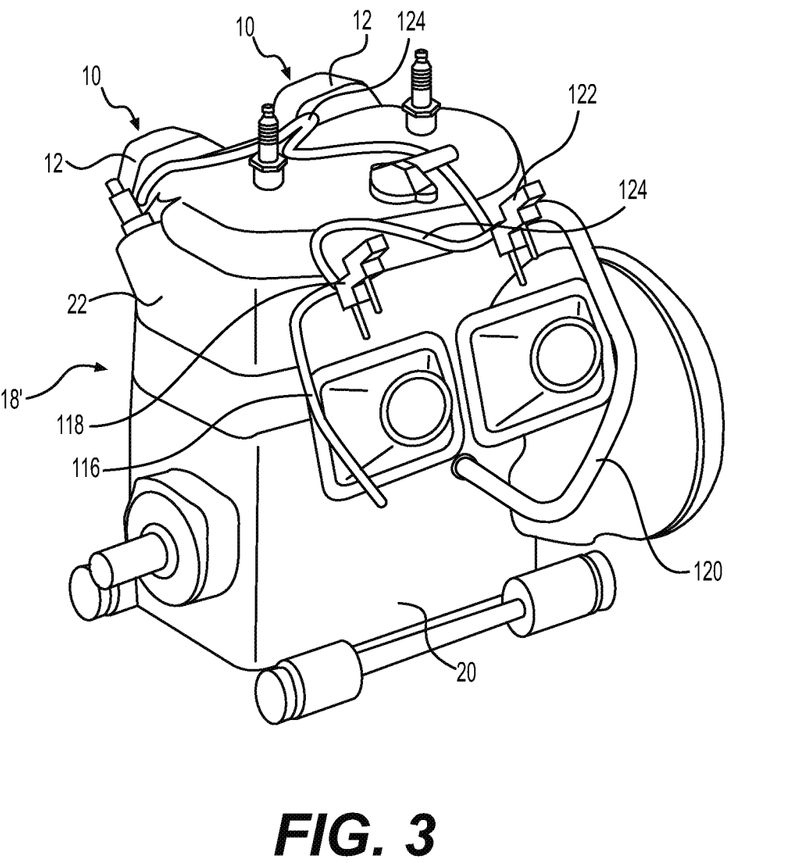
FIG. 3 is a perspective view of an engine having exhaust valve assemblies like the exhaust valve assembly of the engine of FIG. 1 and a pressure control device.

FIG. 3 illustrates one possible implementation of a pressure control device for fluidly communicating the pressure chambers 100 of two valve actuators 12 on an engine 18' with a plurality of pressure sources. During operation of the engine 18', positive and negative pressures are created inside the crankcase 20. A first line 116 fluidly communicates the crankcase 20 with a first solenoid valve 118. A first one-way valve (not shown) is disposed in the first line 116 to only permit a positive pressure to be supplied to the first solenoid valve 118. A second line 120 fluidly communicates the crankcase 20 with a second solenoid valve 122. A second one-way valve (not shown) is disposed in the second line 120 to only permit a negative pressure to be supplied to the second solenoid valve 122. Lines 124 fluidly communicate the first and second solenoid valves 118, 122 with the ports 112 of the pressure chambers 100 of the valve actuators 12. By selectively opening and closing the solenoid valves 118, 122, it is thus possible to supply one of a positive pressure and a negative pressure to the pressure chambers 100 of the valve actuators 12. A third valve (not shown) selectively fluidly communicates the pressure chambers 100 with the air surrounding the engine 18' so as to supply an ambient pressure to the pressure chambers 100. It is contemplated that a pressure equivalent to an ambient pressure could be supplied to the pressure chambers 100 by supplying controlled amounts of both the positive and the negative pressures by using solenoid valves 118 and 122. An electronic control unit (not shown) determines which pressure is to be supplied to the pressure chambers 100 based on the engine speed, as described below, and opens and closes the valves 118, 122 accordingly so as to obtain a desired position of the valves 14, 16 of the valve assembly 10. It is contemplated that the electronic control unit could also determine which pressure is to be supplied to the pressure chambers 100 based on other operating conditions of the engine 18' or of components associated with the engine 18', such as, for example, a degree of throttle opening or a rate of acceleration of the engine 18' or a combination of two or more of the engine speed, the degree of throttle opening, the rate of acceleration. Other pressure control devices are contemplated, such as those disclosed in U.S. Pat. No. 6,244,227 B1, issued Jun. 12, 2001 to Matte, entitled "Valve Assembly Using Pressurized Medium for Controlling Operating Conditions of a Two-Stroke Engine".

It is contemplated that the pneumatic actuator 12 described above could be replaced with another type of actuator having three positions. For example, the actuator 12 could be a three position solenoid.

Figure 5A:
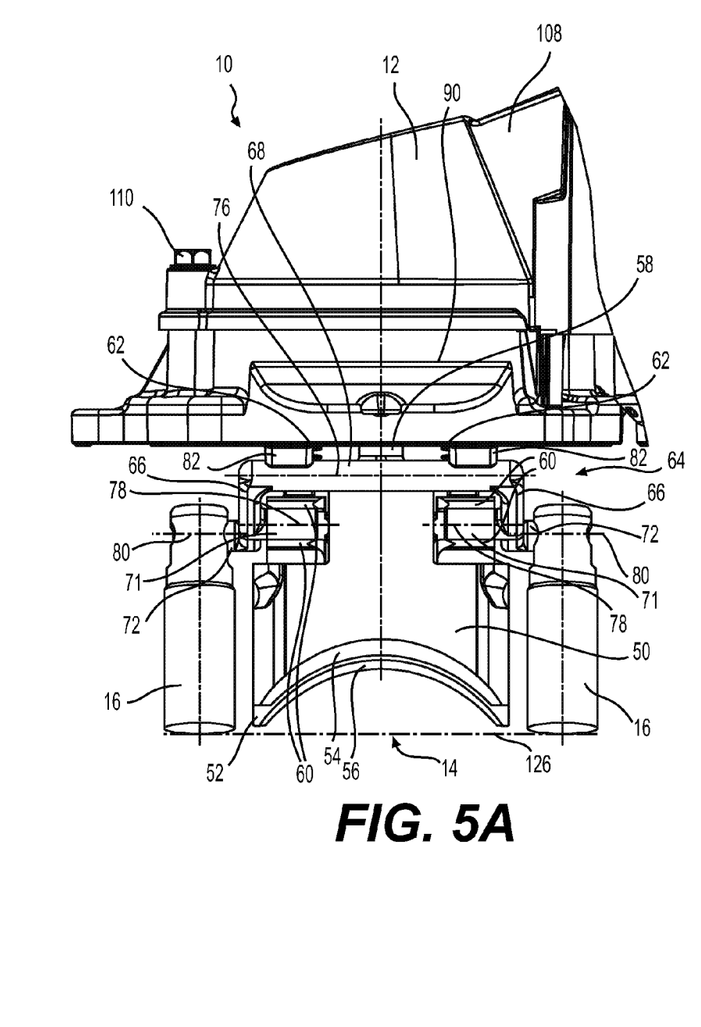
FIG. 5A is a front elevation view the exhaust valve assembly of FIG. 4A with the first valve part in an intermediate position and the second valve part and the auxiliary valves in flow restricting positions.
Figure 5B:
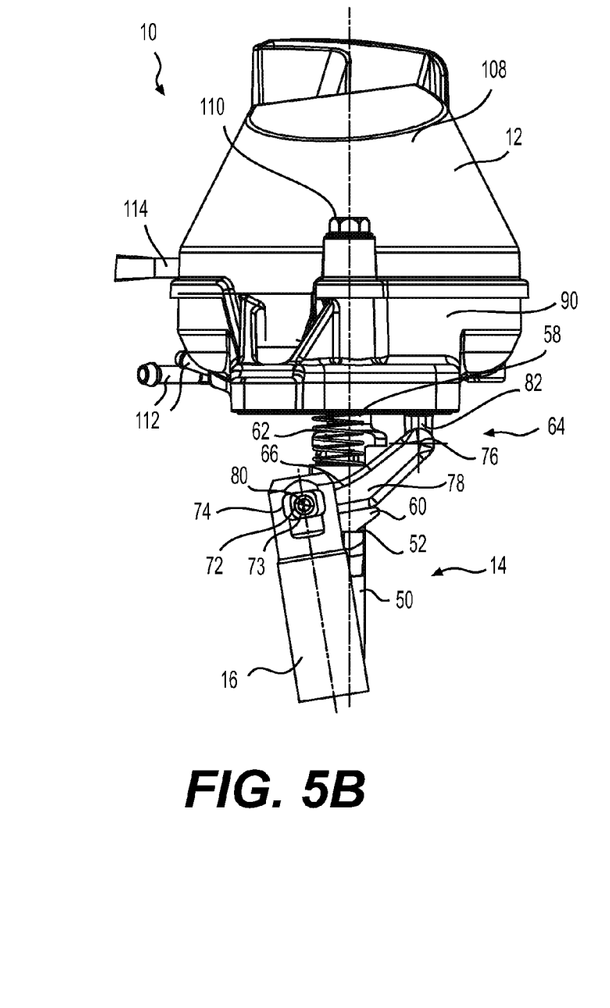
FIG. 5B is a right side elevation view of the exhaust valve assembly in the position shown in FIG. 5A.
Figure 5C:
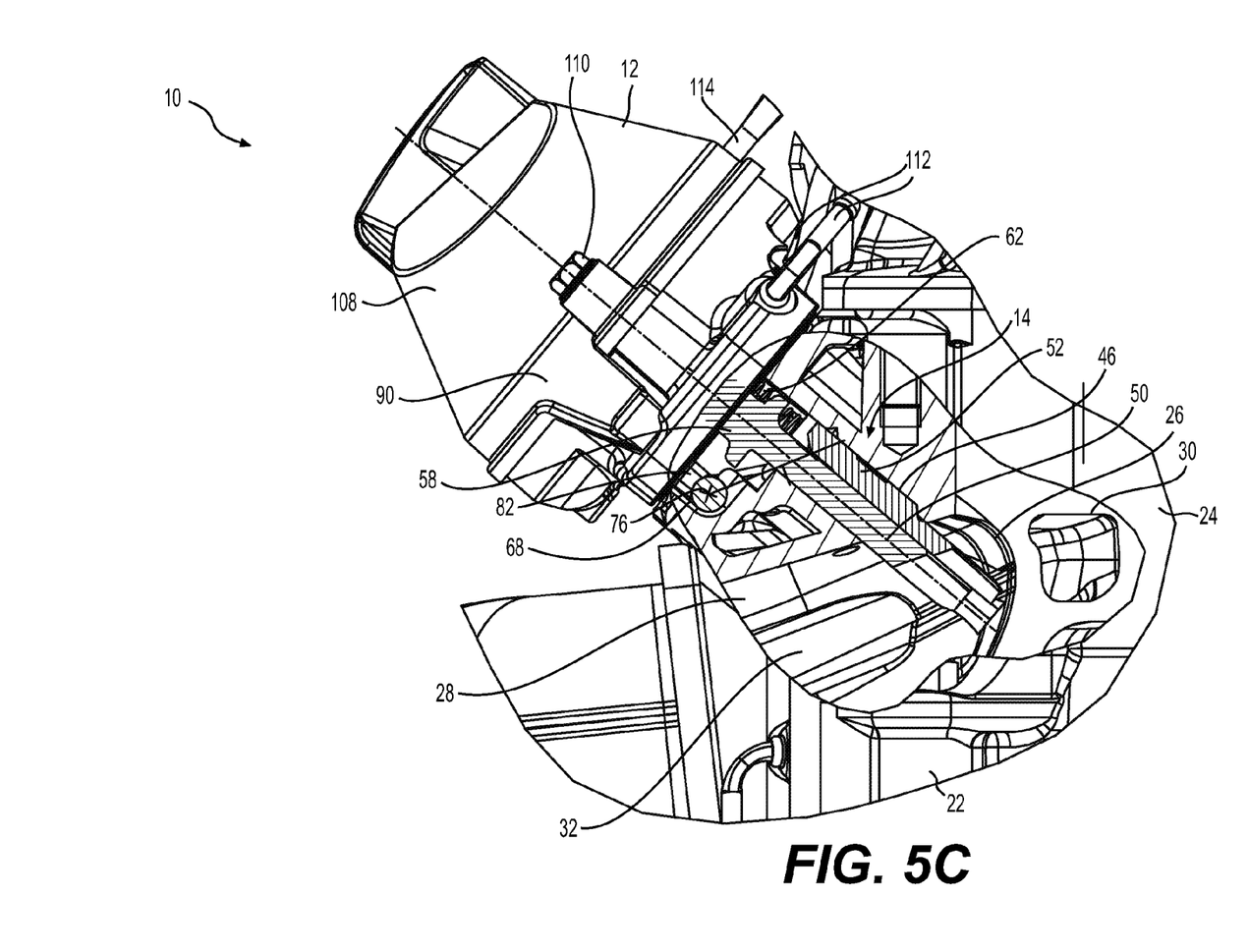
FIG. 5C is a partial cross-sectional view of the exhaust valve assembly in the position shown in FIG. 5A shown on the engine of FIG. 1.
Figure 5D:
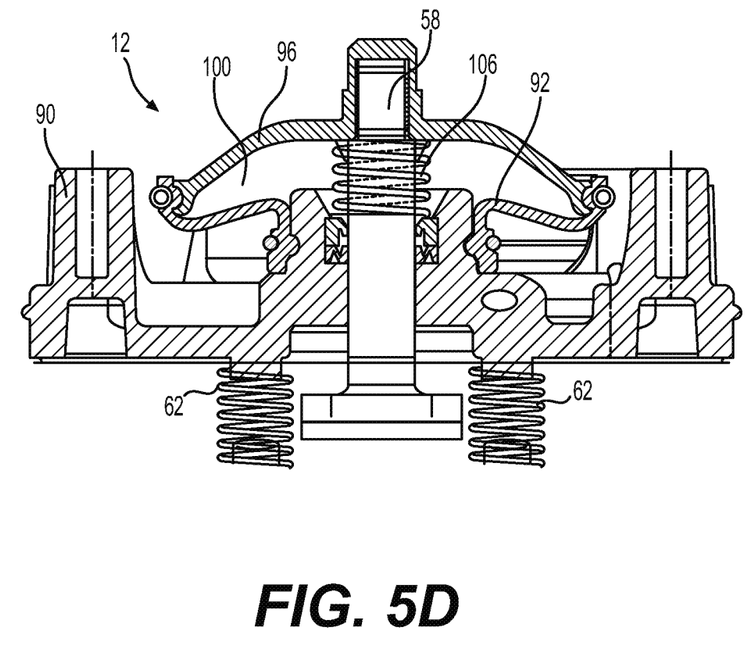
FIG. 5D is a cross-sectional view of the actuator of the exhaust valve assembly shown in a position corresponding to the position of the exhaust valve assembly shown in FIG. 5A.
Figure 6A:
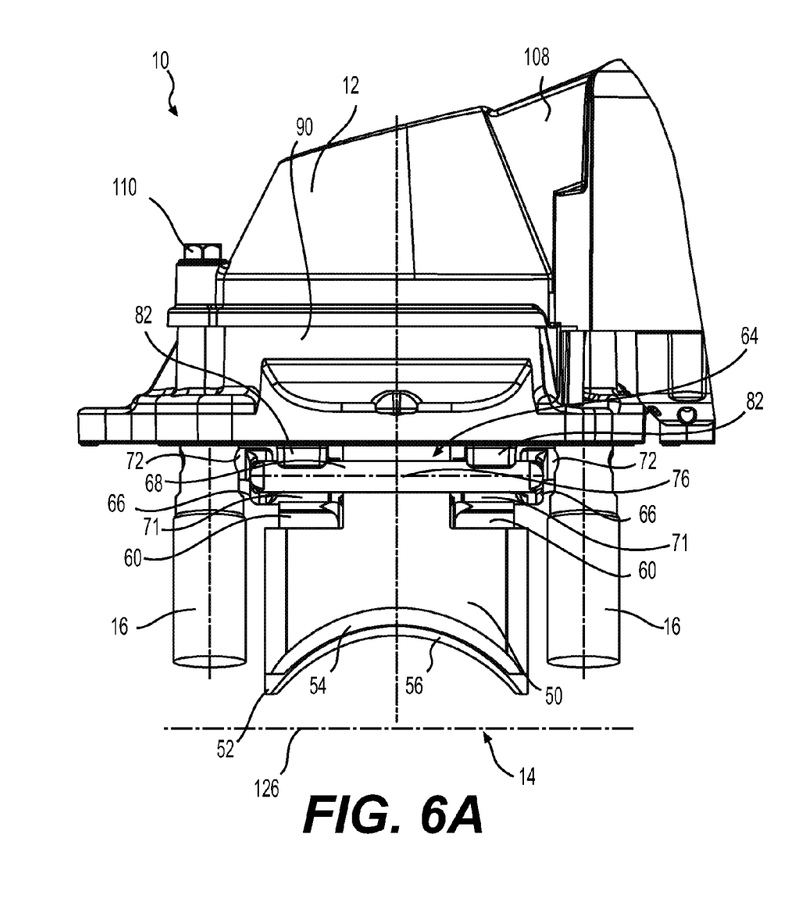
FIG. 6A is a front elevation view the exhaust valve assembly of FIG. 4A with the first valve part, the second valve part and the auxiliary valves in full flow positions.

The operation of the valve assembly 10 will now be described in association with FIGS. 4A to 6D. Line 126 in FIGS. 4A, 5A and 6A is a line passing through the points where the ends of the edge 54 of the first valve part 50 meet the cylinder 24 when the first valve part 50 is in its flow restricting position shown in FIG. 4A. Line 126 has been added simply to illustrate the movement of the valves 14, 16 relative to the cylinder 24.

As previously mentioned, at low engine speeds, it is desirable to restrict the flow of the exhaust gases through the exhaust port 26 and auxiliary exhaust ports 30. Thus, at low engine speeds, the valve 14 is moved to the position shown in FIGS. 4A to 4C. To move the valve 14 to this position, a negative pressure is supplied to the pressure chamber 100. Since the negative pressure is sufficient to overcome the bias of the spring 106, the volume of the pressure chamber 100 is decreased as shown in FIG. 4D. This causes the spring 106 to be in compression and the pressure chamber wall 96 moves the first valve part 50 in a flow restricting position in the exhaust port 26. The second valve part 52 is held in a flow restricting position by the bias of springs 62. The auxiliary valves 16 which move with the second valve part 52 via the lever 64 are also held in their flow restricting positions in the auxiliary exhaust passages 30.

At medium engine speeds, it is desirable to restrict the flow of the exhaust gases through the exhaust port 26, but to a lesser degree than at low engine speeds. It has also been found that it is desirable to restrict the flow of exhaust gases through the auxiliary exhaust ports 30 to the same degree as at low engine speeds. Thus, at medium engine speeds, the valve 14 is moved to the position shown in FIGS. 5A to 5C. To move the valve 14 to this position, an ambient pressure is supplied to the pressure chamber 100. Since the ambient pressure is insufficient to overcome the bias of the spring 106, the volume of the pressure chamber 100 is changed to reach a volume where the spring 106 is slightly compressed as shown in FIG. 5D. The spring 106 is slightly compressed due to the bias applied by springs 62 on the first valve part 50 via the lower fingers 60 of the second valve part 52. The pressure chamber wall 96 moves the first valve part 50 in an intermediate position in the exhaust port 26. The intermediate position is intermediate the full flow position (FIG. 6A to 6C) and the flow restricting position (FIG. 4A to 4C) of the first valve part 50. The second valve part 52 is held in its flow restricting position by the bias of springs 62. As such, the auxiliary valves 16 are also held in their flow restricting positions in the auxiliary exhaust passages 30.

At high engine speeds, it is desirable that the exhaust gases flow freely through the exhaust port 26 and auxiliary exhaust ports 30. Thus, at high engine speeds, the valve 14 is moved to the position shown in FIGS. 6A to 6C. To move the valve 14 to this position, a positive pressure is supplied to the pressure chamber 100. Since the positive pressure is sufficient to overcome the bias of the spring 106, the volume of the pressure chamber 100 is increased as shown in FIG. 6D. This causes the spring 106 to be in extension and the pressure chamber wall 96 moves the first valve part 50 in a full flow position where it is withdrawn from the exhaust port 26. As it is moved to its full flow position, the first valve part 50 pushes against the lower fingers 60 of the second valve part 52 and moves the second valve part 52 to a full flow position where it is withdrawn from the exhaust port 26. When the second valve part 52 is in its full flow position the springs 62 are in compression. As the second valve part 52 moves to its full flow position, the fingers 60 lift the shafts 70 of the lever 64 with the second valve part 52. As a result, since the shaft 68 abuts the posts 82, the lever 64 pivots about the central axis 76 of the shaft 68 thereby causing the auxiliary valves 16 to move to full flow positions where they are withdrawn from the auxiliary exhaust ports 30.

The ranges of engine speeds corresponding to low, medium and high engine speeds providing the above described valve positions depend on the specific configuration of the engine and its associated components and on the desired performance characteristics of the engine.

Figure 6B:
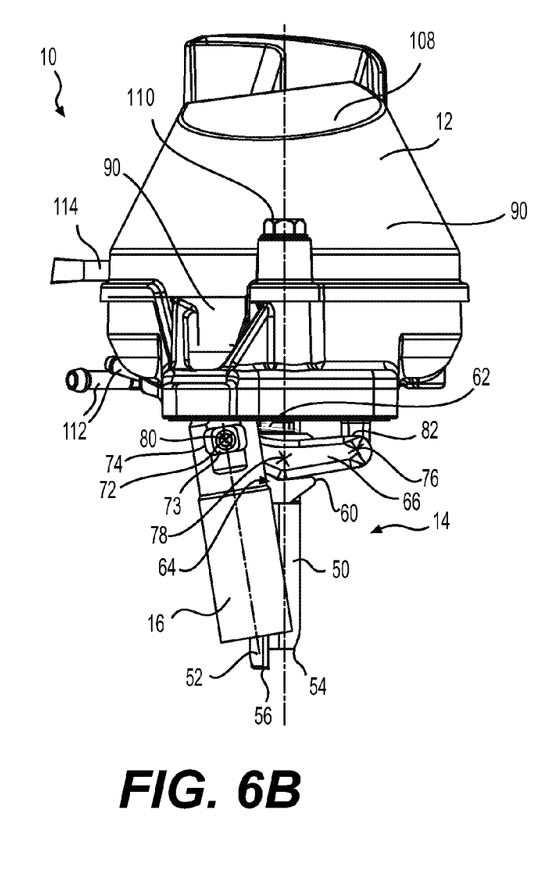
FIG. 6B is a right side elevation view of the exhaust valve assembly in the position shown in FIG. 6A.
Figure 6C:
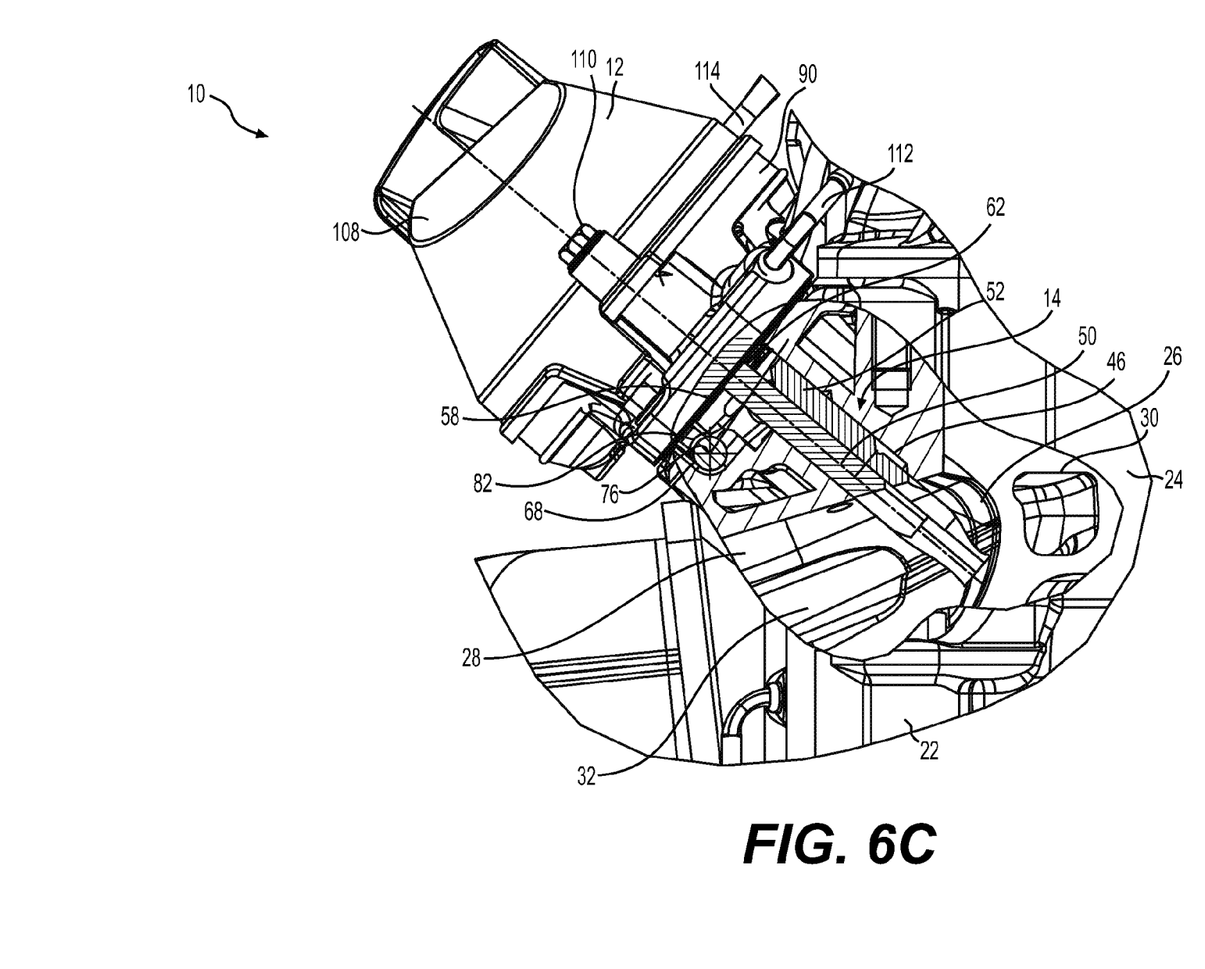
FIG. 6C is a partial cross-sectional view of the exhaust valve assembly in the position shown in FIG. 6A shown on the engine of FIG. 1.
Figure 6D:
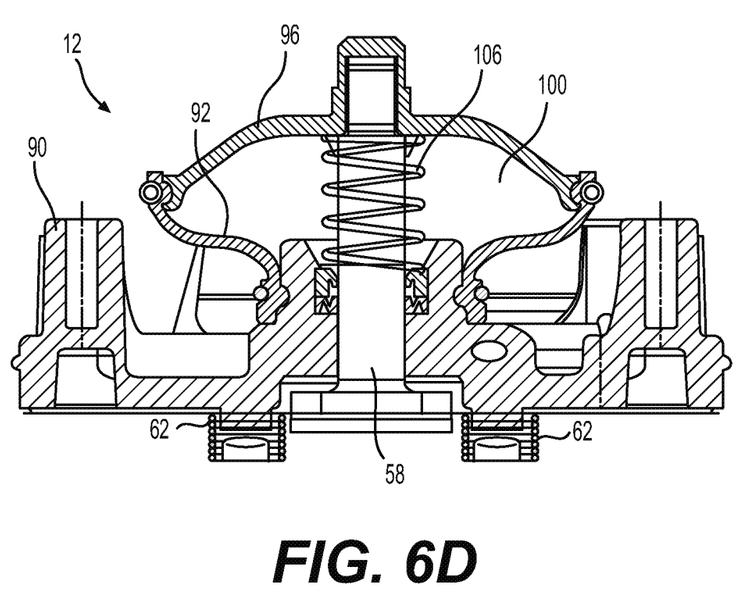
FIG. 6D is a cross-sectional view of the actuator of the exhaust valve assembly shown in a position corresponding to the position of the exhaust valve assembly shown in FIG. 6A.

Due to the geometry of the arms 66 of the lever 64, the distance traveled by the auxiliary exhaust valves 16 between their flow restricting positions shown in FIGS. 4A to 4C and 5A to 5C and their full flow positions shown in FIGS. 6A to 6C is greater than the distance traveled by the first valve part 50 between its flow restricting position shown in FIGS. 4A to 4C and its full flow position shown in FIGS. 6A to 6C. Therefore, for implementations having equivalent displacement of the first valve part 50, since the auxiliary exhaust valves 16 in the implementation described above can be displaced by a greater amount than if they were connected to the first valve part 50 to move therewith, as in U.S. Pat. No. 7,484,482 for example, the exhaust ports 30 and exhaust passages 32 can have a greater height for the same dimension of auxiliary valves 16 than in implementations where the auxiliary valves 16 are connected to the first valve part 50 to move therewith. Therefore, in addition to improving performance at medium engine speeds by maintaining the auxiliary exhaust valves 16 in their flow restricting positions at medium engine speeds, the exhaust valve assembly 10 can also improve performance at high engine speeds by allowing auxiliary exhaust ports 30 and passages 32 of bigger size to be provided in the engine 18.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An exhaust valve assembly for a two-stroke internal combustion engine comprising:
    a valve actuator movable between a first position, a second position and a third position, the second position being intermediate the first and third positions;
    a two-part valve having a first valve part and a second valve part, the first valve part being operatively connected to the valve actuator,
    the first valve part being in a fourth position when the valve actuator is in the first position,
    the first valve part being in a fifth position when the valve actuator is in the second position,
    the first valve part being in a sixth position when the valve actuator is in the third position,
    the fifth position being intermediate the fourth position and the sixth position,
    the second valve part being in a seventh position when the valve actuator is in the first position,
    the second valve part being in the seventh position when the valve actuator is in the second position,
    the second valve part being in an eighth position when the valve actuator is in the third position; and
    at least one auxiliary valve operatively connected to the second valve part,
    the at least one auxiliary valve being in a ninth position when the second valve part is in the seventh position, and
    the at least one auxiliary valve being in a tenth position when the second valve part is in the eighth position.

2. The exhaust valve assembly of claim 1, wherein a distance traveled by the at least one auxiliary valve between the ninth and tenth positions is greater than a distance traveled by the first valve part between the fourth and sixth positions.

3. The exhaust valve assembly of claim 1, wherein the fourth, seventh and ninth positions are flow restricting positions of the first valve part, the second valve part and the at least one auxiliary valve respectively;
    wherein the sixth, eighth and tenth positions are full flow positions of the first valve part, the second valve part and the at least one auxiliary valve respectively; and
    wherein the fifth position is an intermediate position of the first valve part.

4. The exhaust valve assembly of claim 1, further comprising a lever pivotally connecting the at least one auxiliary valve to the second valve part.

5. The exhaust valve assembly of claim 4, wherein the lever comprises:
    at least one arm having a first end and a second end;
    at least one first shaft connected to the first end of the at least one arm, the at least one first shaft being pivotally connected to the at least one auxiliary valve;
    at least one second shaft connected between the first and second ends of the at least one arm, the at least one second shaft being pivotally connected to the second valve part; and
    at least one third shaft connected to the second end of the at least one arm, the at least one third shaft abutting a portion of the valve actuator.

6. The exhaust valve assembly of claim 5, wherein the at least one third shaft abuts at least one post extending from the valve actuator.

7. The exhaust valve assembly of claim 5, wherein the at least one arm is V-shaped; and
    wherein the at least one second shaft is connected at a corner of the V-shaped arm.

8. The exhaust valve assembly of claim 5, wherein the second valve part has at least one pair of fingers; and
    wherein the at least one second shaft is received between the at least one pair of fingers.

9. The exhaust valve assembly of claim 8, wherein when the first valve part moves from the fifth position to the sixth position, the first valve part abuts at least one of the fingers to move the second valve part from the seventh position to the eight position and the at least one auxiliary valve from the ninth position to the tenth position.

10. The exhaust valve assembly of claim 1, wherein when the first valve part moves from the fifth position to the sixth position, the first valve part abuts a portion of the second valve part to move the second valve part from the seventh position to the eight position and the at least one auxiliary valve from the ninth position to the tenth position.

11. The exhaust valve assembly of claim 1, further comprising at least one spring for biasing the second valve part toward the seventh position.

12. The exhaust valve assembly of claim 1, wherein the at least one auxiliary valve is two auxiliary valves; and
    wherein the first valve part and the second valve part are disposed between the two auxiliary valves.

13. The exhaust valve assembly of claim 1, wherein the valve actuator is biased toward the second position.

14. The exhaust valve assembly of claim 1, wherein the valve actuator is a pneumatic actuator.

15. An internal combustion engine comprising:
    a crankcase;
    a crankshaft disposed in the crankcase;
    a cylinder block connected to the crankcase, the cylinder block having a main exhaust passage and at least one auxiliary exhaust passage;
    a cylinder disposed in the cylinder block;
    a piston movably disposed within the cylinder and being operatively connected to the crankshaft; and
    the valve assembly of claim 1 connected to the cylinder block;
    wherein when the first valve part is in the fourth position, the first valve part extends a first distance in the main exhaust passage;

wherein when the first valve part is in the fifth position, the first valve part extends a second distance in the main exhaust passage, the second distance being less than the first distance;

wherein when the first valve part is in the sixth position, the first valve part is withdrawn from the main exhaust passage;

wherein when the second valve part is in the seventh position, the second valve part extends a third distance in the main exhaust passage;

wherein when the second valve part is in the eighth position, the second valve part is withdrawn from the main exhaust passage;

wherein when the at least one auxiliary valve is in the ninth position, the at least one auxiliary valve extends a fourth distance in the at least one auxiliary exhaust passage; and wherein when the at least one auxiliary valve is in the tenth position, the at least one auxiliary valve is withdrawn from the at least one auxiliary exhaust passage.

16. The engine of claim 15, wherein the fourth distance is greater than the second and third distances.

17. A method of operating an exhaust valve assembly of a two-stroke internal combustion engine, the valve assembly including: a valve actuator, a two-part valve having a first valve part operatively connected to the valve actuator and a second valve part, and at least one auxiliary valve operatively connected to the two-part valve, the method comprising:

moving the valve actuator between a first position, a second position and a third position, the second position being intermediate the first and third positions;

moving the first valve part to a fourth position when the valve actuator is moved to the first position;

moving the first valve part to a fifth position when the valve actuator is moved to the second position;

moving the first valve part to a sixth position when the valve actuator is moved to the third position, the fifth position being intermediate the fourth position and the sixth position;

moving the second valve part to a seventh position when the valve actuator is moved to of the first position;

moving the second valve part to the seventh position when the valve actuator is moved to the second position;

moving the second valve part to an eighth position when the valve actuator is moved to the third position;

moving the at least one auxiliary valve to a ninth position when the second valve part is moved to the seventh position; and moving the at least one auxiliary valve to a tenth position when the second valve part is moved to the eighth position.

* * * * *